(12) United States Patent
Morita et al.

(10) Patent No.: US 6,548,605 B1
(45) Date of Patent: Apr. 15, 2003

(54) AQUEOUS EMULSION COMPOSITION AND ADHERENT COMPOSITION

(75) Inventors: Hirofumi Morita, Osaka (JP); Susumu Okatani, Osaka (JP)

(73) Assignee: Mitsui Takeda Chemicals Inc., Tokyo (JP)

( * ) Notice: Subject to any disclaimer, the term of this patent is extended or adjusted under 35 U.S.C. 154(b) by 184 days.

(21) Appl. No.: 09/722,595

(22) Filed: Nov. 28, 2000

(30) Foreign Application Priority Data

Nov. 30, 1999 (JP) .......................................... 11-339075

(51) Int. Cl.[7] .................................................. C08F 8/12
(52) U.S. Cl. .................... 525/330.6; 524/557; 524/812; 524/503; 524/501; 525/330.6; 526/304
(58) Field of Search ....................... 525/330.6; 524/503, 524/501, 812, 557; 526/304

(56) References Cited

U.S. PATENT DOCUMENTS

| | | | |
|---|---|---|---|
| 4,102,946 A | | 7/1978 | Imura et al. .................... 525/59 |
| 4,104,453 A | | 8/1978 | Broering et al. ............... 526/10 |
| 4,150,003 A | * | 4/1979 | McClain et al. ............. 524/394 |
| 4,200,708 A | * | 4/1980 | McClain ....................... 525/62 |
| 4,446,274 A | * | 5/1984 | Okazaki et al. ............. 524/812 |
| 4,564,580 A | * | 1/1986 | Ichimura et al. ............ 430/175 |
| 4,614,781 A | * | 9/1986 | Hori et al. ................ 525/330.6 |
| 4,828,920 A | * | 5/1989 | Nakabayashi et al. ....... 428/349 |
| 4,847,339 A | * | 7/1989 | Heimberg et al. ........ 526/292.1 |
| 5,569,703 A | * | 10/1996 | Yoshii et al. ................ 156/327 |

FOREIGN PATENT DOCUMENTS

| | | |
|---|---|---|
| DD | 88 404 | 3/1971 |
| DE | 27 10 771 | 9/1977 |
| EP | 0 145 928 | 6/1985 |
| EP | 0 488 886 | 6/1992 |
| EP | 0 585 929 | 3/1994 |
| FR | 2 062 063 | 6/1971 |
| FR | 2 676 451 | 11/1992 |
| FR | 2 691 710 | 12/1993 |

* cited by examiner

*Primary Examiner*—David W. Wu
*Assistant Examiner*—Henry Hu
(74) *Attorney, Agent, or Firm*—Wenderoth, Lind & Ponack, L.L.P.

(57) ABSTRACT

An aqueous emulsion composition that has high adhesion strength for a variety of materials so that it can be used for the adhesive bonding of even molded products and an adherent composition containing the aqueous emulsion composition. The aqueous emulsion composition comprises a carboxyl modified resin of a saponified ethylene-vinyl acetate copolymer and a surface active agent. This aqueous emulsion composition can be suitably used as adherent composition, such as an primer and an adhesive, for adhesive bonding a variety of molded products, such as plastic films, plastic sheets, plastic foams, fibers, synthetic leathers and metals. Due to the aqueous composition, the composition can have little risk to catch fire and can provide good sanitation in the environment.

10 Claims, No Drawings

AQUEOUS EMULSION COMPOSITION AND ADHERENT COMPOSITION

BACKGROUND OF THE INVENTION

1. Field of the Invention

The present invention relates to an aqueous emulsion composition and an adherent composition and, more particularly, to an aqueous emulsion composition and an adherent composition suitably used as a primer or adhesive.

2. Description of the Prior Art

Organic solvent adhesives are generally in wide use as an adherent composition used for adhesive bonding of a variety of molded products such as plastic films, plastic sheets, plastic foams, fibers, synthetic leathers, and metals.

The organic solvent adhesives have high adhesion strength for relatively rigid molded products, so that they are used for a variety of applications, while on the other hand, they have disadvantages of being at risk of catching fire and being not so desirable in environmental sanitation. In view of these disadvantages, in recent years, aqueous adhesives have been increasingly developed as a substitute for the organic solvent adhesives.

Known as the aqueous adhesives are adherent compositions comprising ethylene-vinyl acetate copolymer containing an aqueous emulsion, for example.

However, the conventional aqueous adhesives that have been developed so far, including the adherent composition comprising ethylene-vinyl acetate copolymer containing an aqueous emulsion, are still insufficient in adhesion strength for adhesive bonding the molded products and thus are practically unusable.

It is the object of the present invention to provide an aqueous emulsion composition that has high adhesion strength for a variety of materials so that it can be used for the adhesive bonding of even molded products and to provide an adherent composition comprising the aqueous emulsion composition.

SUMMARY OF THE INVENTION

An aqueous emulsion composition of the present invention comprises a carboxyl modified resin of a saponified ethylene-vinyl acetate copolymer and a surface active agent.

The aqueous emulsion composition of the present invention can be suitably used as an adherent composition, such as a primer and an adhesive.

It is preferable that in the aqueous emulsion composition of the present invention, the carboxyl modified resin of the saponified ethylene-vinyl acetate copolymer contains the vinyl acetate in the range of 20 to 50 weight % based on the weight of raw materials used to produce the ethylene-vinyl acetate copolymer.

It is preferable that the carboxyl modified resin of the saponified ethylene-vinyl acetate copolymer has a hydroxyl value of 0–250 KOHmg/g and an acid value of 2–150 KOHmg/g.

The aqueous emulsion composition of the present invention may further comprise an unsaturated ethylene monomer or a photo polymerization initiator. The aqueous emulsion composition of the present invention may further comprise chlorinated polyolefin contained resin.

It is preferable that in the aqueous emulsion composition of the present invention, the surface active agent contains an oxyethylene group. Further, it is preferable that the surface active agent contains an anionic group. Also, it is preferable that the aqueous emulsion composition contains the surface active agent in the range of 2 to 24 parts by weight per 100 parts by weight of the carboxyl modified resin of the saponified ethylene-vinyl acetate copolymer.

An adherent composition of the present invention comprises the above-mentioned aqueous emulsion composition.

The adherent composition of the present invention comprising the aqueous emulsion composition has high adhesive strength for a variety of materials, for adhesive bonding a variety of molded products, such as plastic films, plastic sheets, plastic foams, fibers, synthetic leathers and metals. Due to the aqueous composition, the composition has little risk to catch fire and can provide good sanitation in the environment.

DETAILED DESCRIPTION OF THE PREFERRED EMBODIMENTS

The aqueous emulsion composition of the present invention comprises carboxyl modified resin of saponified ethylene-vinyl acetate copolymer and surface active agent.

The carboxyl modified resin of saponified ethylene-vinyl acetate copolymer used in the present invention (hereinafter it is sometimes referred to as "C-HEVA") can be produced by partly saponifying an ethylene-vinyl acetate copolymer (hereinafter it is sometimes referred to as "EVA") and then modifying it by use of acid, as described, for example, by Japanese Patent Publication No. Hei 5(1993)-26,802 disclosing the production process.

The ethylene-vinyl acetate copolymer can be manufactured by a known method such as a high-pressure method and an emulsification method and is available as raw material. According to the present invention, the content of the vinyl acetate used is preferably in the range of 20 to 50 weight %, or further preferably in the range of 25 to 45 weight %, as the ratio of vinyl acetate to the raw material composition. The vinyl acetate copolymer used preferably has the melt index (g/10 min (190° C., 2,160 g) based on ASTM D-1238 (the melt indexes occurring in the following are all the same as this)) of 0.1–500, or further preferably 1–300. The content of vinyl acetate less than that may cause reduction of flexibility and thus reduction of adhesion at low temperature. On the other hand, the content of vinyl acetate more than that may cause reduction of heat resistance.

The ethylene-vinyl acetate copolymer is saponified in the following processes. First, the ethylene-vinyl acetate copolymer is dissolved in organic solvent having a boiling point of not less than 50° C. The organic solvents that may be used include, for example, aromatic hydrocarbons such as benzene, toluene, o-xylene, m-xylene, ethyl benzene, and propyl benzene, and aliphatic or alicyclic hydrocarbons such as n-hexane and cyclohexane. Of these organic solvents, aromatic hydrocarbon, such as xylene and toluene, being capable of causing the azeotropic boiling of water or organic solvent having a boiling point of 100–200° C. are preferably used. While only a required amount of organic solvent to dissolve the ethylene-vinyl acetate copolymer may be used, 150–500 parts by weight of organic solvent per 100 parts by weight of ethylene-vinyl acetate copolymer should preferably be used to allow smooth progress of the next reaction.

Then, after a lower alcohol is added to the solution of ethylene-vinyl acetate copolymer thus prepared, alkali alcoholate is added thereto as catalyst in the presence of a specified amount of water, for saponification reaction.

The lower alcohols that may be used include, for example, methyl alcohol, ethyl alcohol, propyl alcohol, isopropyl alcohol, butyl alcohol, isobutyl alcohol, sec-butyl alcohol and tert-butyl alcohol. Methanol can preferably be cited as the lower alcohol. Preferably, the lower alcohol has the number of moles 0.1–10 times, or further preferably 1–8 times, that of the vinyl acetate contained in the ethylene-vinyl acetate copolymer, though it varies depending on the desired saponification of the ethylene-vinyl acetate copolymer.

The alkali alcoholates that may be used as the catalyst include, for example, alcoholate of alkali metal such as sodium methoxide, sodium ethoxide, potassium methoxide, potassium ethoxide, lithium methoxide and potassium-t-butoxide. Preferably, the alkali alcoholate has the number of moles 0.01–1 times, or further preferably 0.01–0.2 times, that of the vinyl acetate contained in the ethylene-vinyl acetate copolymer, though it varies depending on the desired saponification of the ethylene-vinyl acetate copolymer.

For example, 0.1–3 moles of water per mole of alkali alcoholate is preferably used with alkali alcoholate.

The saponification may be performed by using the known condition that after a specified time (e.g. 0.5–3 hours) passing at a specified temperature (e.g. 40–60° C.), water is added to reactive system to terminate the reaction. The degree of saponification is in the order of 10–90%, though no particular limitation is imposed thereon.

Then, the partly saponified ethylene-vinyl acetate copolymer thus produced (hereinafter it is sometimes referred to as "HEVA") is modified, for example, by using acid such as unsaturated carboxylic acid or acid anhydride. It is preferable that before the partly saponified ethylene-vinyl acetate copolymer is modified by using acid, the reaction liquid used in the saponifying reaction is heated in advance to distill off the water used to terminate saponification reaction and the by-products having a low boiling point produced by the reaction, so as to remove them. Particularly when the acid anhydride is used as the acid, it is necessary to substantially remove water. This is because water in the reaction system would hinder the modification reaction.

When the unsaturated carboxylic acid is used for modification, the unsaturated carboxylic acid is added to reaction liquid and heated in the presence of radical formation substance, for the modification reaction. The unsaturated carboxylic acid that may be used include, for example, unsaturated monocarboxylic acid or unsaturated dicarboxylic acid, such as acrylic acid, methacrylic acid, crotonic acid and itaconic acid. Preferably, not more than 5 parts by weight, or preferably 0.2–3 parts by weight, of unsaturated carboxylic acid is used per 100 parts by weight of partly saponified ethylene-vinyl acetate copolymer.

The radical formation substance is the substance that is easily decomposed at the reaction temperature for modification reaction to form free radical. The radical formation substances include, for example, organic peroxide, such as benzoyl peroxide, lauroyl peroxide and dicumyl peroxide, and nitrogen containing compound such as α,α'-azobisisobutyronitrile. Preferably, 0.05–3 parts by weight, or preferably 0.01–1 parts by weight, of radical formation substance is used per 100 parts by weight of partly saponified ethylene-vinyl acetate copolymer.

The heating temperature is preferably in the range of about 50 to about 150° C., through it varies depending on types of unsaturated carboxyl acids and organic solvents used, and the heating time is preferably in the range of about 0.1 to 5 hours.

When the acid anhydride is used for modification, the acid anhydride is added to the reaction liquid and heated, for the modification reaction. The acid anhydrides that may be used include, for example, saturated or unsaturated, aliphatic, alicyclic or aromatic anhydride, such as maleic anhydride, succinic anhydride, glutaric anhydride, phthalic anhydride, hexahydrophthalic anhydride, methylhexahydrophtalic anhydride, tetrahydrophtalic anhydride, methyltetrahydrophtalic anhydride and trimellitic anhydride. Preferably, not more than 150 parts by weight, or preferably 10–100 parts by weight, of acid anhydride is used per 100 parts by weight of partly saponified ethylene-vinyl acetate copolymer. Preferably, 5–100 mol %, or preferably 50–100 mol %, of the vinyl alcohol unit contained in the partly saponified ethylene-vinyl acetate copolymer is estelified by using this specified amount of acid anhydride.

The heating temperature is preferably in the range of about 50 to about 150° C., through it varies depending on types of acid anhydrides and organic solvents used, and the heating time is preferably in the range of about 0.1 to 5 hours.

Preferably, the carboxyl modified resin of the saponified ethylene-vinyl acetate copolymer thus produced has the acid value of 2–150 KOHmg/g, or further preferably 3–100 KOHmg/g, and the hydroxyl value of 0–250 KOHmg/g, or further preferably 0–160 KOHmg/g.

The acid value less than that may cause reduction of adhesion properties, while on the other hand, the acid value more than that may cause reduction of water resistance. The hydroxyl value more than that may cause cohesive force and reduction of adhesion properties at low temperature.

The surface active agent used in the present invention is not limited to any particular one. Any known surface active agent may be used. The surface active agents that may be used include, for example, anionic surface active agents, such as fatty acid salt, alkyl sulfate, alkyl benzene sulfate, alkyl sulfosuccinate, polyoxyalkylene alkylether sulfate, polyoxyalkylene alkylether carboxylate and polyoxyalkylene alkylether phosphate, cationic surface active agents, such as alkylamine salt and quaternary ammonium salt, and nonionic surface active agents, such as polyoxyalkylene alkyl ether, polyoxyalkylene alkylphenyl ether and sorbitan fatty acid ester. In the present invention, the surface active agent having an oxyethylene group is preferably used. The surface active agents having the oxyethylene groups include, for example, polyoxyethylene surface active agent, such as polyoxyethylene alkylether sulfate, polyoxyethylene alkylether, polyoxyethylene alkylphenylether, polyoxyethylene sorbitan fatty acid ester and derivatives of other polyoxyethylene. Of these polyoxyethylene surface active agents, a polyoxyethylene surface active agent having an anionic group is preferable. For example, polyoxyethylene alkylether sulfate can be cited as the polyoxyethylene surface active agent having anionic group.

These surface active agents may be used singly or in combination of two or more. Preferably, 0.5–30 parts by weight, preferably 2–24 parts by weight, or further preferably 5–20 parts by weight, of surface active agent is used per 100 parts by weight of carboxyl modified resin of the saponified ethylene-vinyl acetate copolymer. The amount of surface active agent less than that may cause reduction of dispersibility, while on the other hand, the amount of surface active agent more than that may cause reduction of adhesion properties.

The aqueous emulsion composition of the present invention can be produced by the process that after the carboxyl modified resin of the saponified ethylene-vinyl acetate copolymer and the surface active agent are mixed in the proportion specified above, the mixture is emulsified by adding water thereto.

Preferably, 50–1,000 parts by weight, or preferably 100–500 parts by weight, of water is added per 100 parts by weight of the mixture.

Emulsification may be effected by any known process. For example, the mixture to which water is added may be agitated to be forcibly emulsified. In this emulsification, a remaining organic solvent contained in the carboxyl modified resin of the saponified ethylene-vinyl acetate copolymer is preferably distilled off by the azeotropic boiling of water.

Preferably, the aqueous emulsion composition thus produced is finally prepared in the solid content of 5–70 weight %, or preferably 10–50 weight %.

Unsaturated ethylene monomer may be mixed in the aqueous emulsion composition thus produced. The adhesion properties can properly be adjusted by the mixture of the ethylene unsaturated monomer.

For example, monofunctional monomer, difunctional monomer and polyfunctional monomer may be used as the ethylene unsaturated monomer.

The monofunctional monomers (monofunctional polymerization diluents) include, for example, heterocyclic ethylene unsaturated compound (e.g. N-vinyl-nitrogen-contained heterocyclic compound, such as N-vinylpyrolidone, N-vinylpyridine and N-vinylcaprolactam, and heterocyclic (metha) acrylate, such as morpholine (metha) acrylate and tetrahydrofurfuryl (metha) acrylate), N-vinylformamide, N-vinylacetamide, dialkyl aminoethyl (metha) acrylate (e.g. dimethyl aminoethyl (metha) acrylate and diethyl aminoethyl (metha) acrylate), N, N'-dimethyl acrylamide, alkoxy (poly) alkylene glycol (metha) acrylate (e.g. methoxy ethylene glycol (metha) acrylate, methoxy polyethylene glycol (metha) acrylate and butoxy polyethylene glycol (metha) acrylate), alkylphenoxyethyl (metha) acrylate (e.g. nonyl phenoxyethyl (metha) acrylate), phenoxy (poly) alkylene glycol (metha) acrylate (e.g. phenoxyethyl (metha) acrylate and phenoxypolyethylene glycol (metha) acrylate), alkyl (metha) acrylate (e.g. butyl (metha) acrylate and 2-ethylhexyl (metha) acrylate), cycloalkyl (metha) acrylate (e.g. cyclohexyl (metha) acrylate), aralkyl (metha) acrylate (e.g. benzyl (metha) acrylate), (metha) acrylate having crosslinked cyclic hydrocarbon group (e.g. isobornyl (metha) acrylate, dicyclopentadiene (metha) acrylate, dicyclopentenyl (metha) acrylate, tricyclodecanyl (metha) acrylate, dicyclopentenyloxyalkyl (metha) acrylate, tricyclodecanyloxyethyl (metha) acrylate and isobornyloxyethyl (metha) acrylate), hydroxyl group contained (metha) acrylate (e.g. 2-hydroxyethyl (metha) acrylate, 2-hydroxypropyl (metha) acrylate, 3-chloro-2-hydroxypropyl (metha) acrylate, 2-hydroxy-3-phenyloxypropyl (metha) acrylate, 2-(metha) acryloyloxyethyl-2-hydroxyethyl phthalate, 3-acryloyloxyglycerinmono (metha) acrylate, 2-hydroxybutyl (metha) acrylate, 4- hydroxybutyl (metha) acrylate, pentanediolmono (metha) acrylate, 2-hydroxyalkyl (metha) acryloyl phosphate, 4-hydroxycyclohexyl (metha) acrylate, neopenthyl glycol mono (metha) acrylate, polypropylene glycol mono (metha) acrylate, and polyethylene glycol mono (metha) acrylate), poly ε-caprolactone mono (metha) acrylate, glycidyl (metha) acrylate, mono[2-(metha) acryloyloxyethyl] acid phosphate, halogen contained (metha) acrylate (e.g. trifluoroethyl (metha) acrylate, 2,2,3, 3-tetrafluoropropyl (metha) acrylate, 2,2,3,4,4,4-hexafluorobutyl (metha) acrylate and perfluorooctylethyl (metha) acrylate).

The difunctional monomers (difunctional polymerization diluents) include, for example, di(metha)acrylate of 2,2-dimethyl-3-hydroxypropyl-2,2-dimethyl-3-hydroxypropionate, (polyoxy) alkylene glycol di (metha) acrylate (e.g. ethylene glycol di (metha) acrylate, diethylene glycol di (metha) acrylate, tetraethylene glycol di (metha) acrylate, polyethylene glycol di (metha) acrylate, propylene glycol di (metha) acrylate, polypropylene di (metha) acrylate, 1,4-butandiol di (metha) acrylate, 1,6-hexandiol di (metha) acrylate, neopentyl glycol di (metha) acrylate and pentanediol di (metha) acrylate), glycerin di (metha) acrylate, trimethylolpropane di (metha) acrylate, pentaerythritol di (metha) acrylate, di (metha) acrylate of bisphenol A of alkyleneoxide (ethylene oxide, propylene oxide) adduct (e.g. di (metha) acrylate of 2,2-bis (2-hydroxyethoxyphenyl) propane), di (metha) acrylate having crosslinked cyclic hydrocarbon group (e.g. di (metha) acrylate of tricyclodecane dimethylol, dicyclopentadiene di (metha) acrylate), and (metha) acrylic acid adduct of difunctional epoxy resin (e.g. (metha) acrylic acid adduct of 2,2-bis (glycidyloxyphenyl) propane).

The polyfunctional monomers (polyfunctional polymerization diluents) include, for example, trimethylolpropane tri (metha) acrylate, trimethylolpropane trioxy tri (metha) acrylate, pentaerythritol tetra (metha) acrylate, dipentaerythritol hexa (metha) acrylate, tetramethylolmethane tri (metha) acrylate, tetramethylolmethane tetra (metha) acrylate, tris (acryloyloxy) isocyanurate, tri (metha) acrylate of tris (2-hydroxyethyl) isocyanurate, tri (metha) acrylate of tris (hydroxypropyl) isocyanurate, triallyl trimellitic acid and triallyl isocyanurate.

These ethylene unsaturated monomers may be used singly or in combination of two or more. Preferably, 1–200 parts by weight of the total amount of ethylene unsaturated monomer is used per 100 parts by weight of carboxyl modified resin of the saponified ethylene-vinyl acetate copolymer.

Also, a photo polymerization initiator may be mixed in the aqueous emulsion composition thus produced. The photo polymerization initiators that may be used include, for example, the photo polymerization initiators of acylphosphineoxide, of acetophenone, of benzoinether, of benzophenone and of thioxantone.

The acylphosphineoxide photo polymerization initiators include, for example, 2,4,6-trimethylbenzoyl diphenylphosphineoxide (e.g. Lucirin TPO available from BASF Aktiengesellshaft), bis (2,6-dimethoxybenzoyl)-2,4,4-trimethylpenthyl phosphineoxide (BAPO), bis (2,4,6-trimethylbenzoyl) phenylphosphineoxide, bis (2,4,6-trimethylbenzoyl) ethylphosphineoxide, and bis (2,4,6-trimethylbenzoyl) n-butylphosphineoxide.

The acetophenone photo polymerization initiators include, for example, diethoxyacetophenone, 2-hydroxy-2-methyl-1-phenyl-1-propanone (e.g. Darocur 1173 available from Ciba Specialty Chemicals), benzildimethyl ketal (e.g. Irgacure 651 available from Ciba Specialty Chemicals, Lucirin BDK available from BASF Aktiengesellshaft etc.), 1-hydroxy-cyclohexyl-phenyl-ketone (e.g. Irgacure 184 available from Ciba Specialty Chemicals), 2-methyl-2-morpholino (4-thiomethylphenyl)-1-propanone (e.g. Irgacure 907 available from Ciba Specialty Chemicals), 2-benzil-2-dimethylamino-1-(4-morpholinophenyl)-butanone (e.g. Irgacure 369 available from Ciba Specialty Chemicals), and oligomer of 2-hydroxy-2-methyl-1-[4-(1-methylvinyl)phenyl] propanone (e.g. Esacure KIP available from Fratelli Lamberti s.p.a.).

The benzoinether photo polymerization initiators include, for example, benzoin, benzoin methylether, benzoin ethylether, benzoin isopropylether, and benzoin isobutylether.

The benzophenone photo polymerization initiators include, for example, benzophenone, o-benzoyl methyl benzoate, 4-phenyl benzophenone, 4-benzoyl-4'-methyldiphenylsulfide, 2,4,6-trimethyl benzophenone, and (4-benzoylbenzil) trimethylammoniumchloride.

The thioxantone photo polymerization initiators include, for example, 2- or 4-isopropylthioxantone, 2,4-diethylthioxantone and 2,4-dichlorothioxantone.

In addition to these, for example, methylphenylglyoxyester (Bycure 55 available from AKZO Nobel), 3,6-bis (2-morpholinoisobutyl)-9-butylcarbazole (A-Cure 3 available from Asahi Denka Kogyo) and Titanocene compound can be cited as the photo polymerization initiators that may be used.

These photo polymerization initiators may be used singly or in combination. To give actual examples, Irgacure-1700 (bis (2,6-dimethoxybenzoil)-2,4,4-trimethylpentyl phosphineoxide/2-hydroxy-2-methylphenylpropane-1-on= 25/75%) and Irgacure-1800 (bis (2,6-dimethoxybenzoil)-2, 4,4-trimethylpentyl phosphineoxide/1-hydroxycyclohexyl-phenylketone=25/75%) (both of which are available from Ciba Specialty Chemicals) can be cited as commercially available ones.

Preferably, 0.001–40 parts by weight, or preferably 0.01–20 parts by weight, of the photo polymerization initiator content is used per 100 parts by weight of the carboxyl modified resin of the saponified ethylene-vinyl acetate copolymer.

To promote photo polymerization reaction caused by the photo polymerization initiator, a variety of photo polymerization promoters, such as dialkylamino benzoic acids or derivatives thereof (e.g. 4-dimethylamino benzoic acid and 4-dimethylamino benzoate) and phosphine photo polymerization promoters (aryl phospine, such as triphenylphosphine, and phosphine compound, such as trialkylphosphine) may selectively be mixed, if required.

Preferably, 0.01–10 parts by weight of the polymerization promotor is used per 100 parts by weight of the ethylene unsaturated monomer.

Chlorinated polyolefin contained resin may be mixed in the aqueous emulsion composition thus produced. The mixture of chlorinated polyolefin contained resin enables the adhesiveness to be properly adjusted.

The chlorinated polyolefin resin itself or the mixture obtained by mixing chlorinated polyolefin resin with other polymer is used as chlorinated polyolefin contained resin. The chlorinated polyolefin resin used is not limited to any particular one. Specifically, the chlorinated polyolefin resins can be cited which are produced by chlorinating polyolefins, such as polyethylene, polypropylene, ethylene-propylene copolymer, ethylene-propylene-diene copolymer, polybutene, ethylene-vinyl acetate copolymer, styrene-butadiene copolymer and styrene-isoprene copolymer, or by chlorinating modified polyolefins, in which carboxyl group, hydroxyl group and acid anhydride are introduced in those polyolefins, by a known manner.

Of these chlorinated polyolefin resins, the chlorinated polyolefin resins produced by chlorinating polypropylene and/or polyethylene are preferably used, because they are easily available and also can provide improved adhesion. Further, the acid-anhydride-modified chlorinated polyolefin resin produced by modifying the chlorinated polyolefin resin by use of maleic anhydride can also be cited. The chlorinated polyolefin resin may selectively be used singly or by mixture of two or more.

Though a chlorine content of the chlorinated polyolefin resin used is not limited to any particular value, a chlorine content of 15–40 weight % can provide improved adhesion to a polyolefin substrate. A chlorine content of less than 15 weight % of the chlorinated polyolefin resin may cause reduction of its compatibility with the other resins to cause reduction of its membrane forming ability. On the other hand, a chlorine content of more than 40 weight % of the chlorinated polyolefin resin may cause reduction of its adhesion to the polyolefin substrate.

Preferably, the chlorinated polyolefin contained resin in the range of 1–1,000 parts by weight is used per 100 parts by weight of the carboxyl modified resin of the saponified ethylene-vinyl acetate copolymer in the total amount of chlorinated polyolefin contained resin.

Known additives, such as an oxidation inhibitor, an ultra-violet absorbent, a coloring agent and a colorant, may be added to the aqueous emulsion composition thus produced, depending on the intended purposes and uses. In addition, rosins or a silane coupling agent may be added to provide further improved adhesive strength, depending on the intended purposes and uses.

The rosins that may be used include, for example, thermoplastic resin with abietic acid as the chief ingredient, such as gum rosin, wood rosin, and tall oil rosin. To be more specific, for example, modified rosins, such as hydrogenerated rosin (dihydroabietic acid and tetrahydroabietic acid), dismutation rosin, dismutation hydrogenerated rosin and polymerized rosin (including partly polymerized rosin), rosin or modified rosins of alkylester, glycol ester, glycerin ester and pentaerythritol ester, and rosin modified polyester using rosin or modified rosin to a part of acid of polyester can be cited. The rosin modified polyester can be produced by reaction of glycidyl ester of rosin or modified rosin with a compound having carboxylic acid.

The rosins may be used singly or in combination of two or more. Preferably, the rosins in the range of 1–20 parts by weight, or preferably 5–15-parts by weight, is used per 100 parts by weight of the carboxyl modified resin of the saponified ethylene-vinyl acetate copolymer.

The silane coupling agents that may be used include, for example, epoxy silane, amino silane and vinyl silane. The epoxy silane is preferably used. The epoxy silanes that may be used include, for example, γ-glycidoxypropyl trimethoxy silane, γ-glycidoxypropyl triethoxy silane, γ-glycidoxypropyl methyldiethoxy silane, and β-(3,4-epoxycyclohexyl) ethyltrimethoxy silane.

The silane coupling agents may be used singly or in combination of two or more. Preferably, the silane coupling agents in the range of 0.05–5 parts by weight, or preferably 0.1–1.0 parts by weight, is used per 100 parts by weight of the carboxyl modified resin of the saponified ethylene-vinyl acetate copolymer.

The aqueous emulsion composition thus produced of the present invention can be suitably used as adherent composition including primer and adhesive. The aqueous emulsion composition of the present invention has high adhesion strength for a variety of materials so that it can be used for the adhesive bonding of a variety of molded products including, for example, plastic films, plastic sheets, plastic foams, fibers, synthetic leathers and metals. In addition, since the emulsion composition of the present invention is aqueous, there is little danger of catching fire, so that good environmental sanitation is secured. Further, the aqueous emulsion composition of the present invention is excellent in initial adhesion, at-low-temperature adhesion, mechanical stability, water resistance and storage stability and thus can effectively be used in a variety of intended uses.

For the bonding by using the adherent composition of the present invention, the adherent composition can be applied, for example, to a substrate to be bonded by any known method. The adherent composition of the present invention can be used without limitation. For example, the adherent composition of the present invention may be used as the primer used in the pretreatment of the bonding or as the adhesive. Also, the adherent composition of the present invention may be used in such a manner as to be mixed in the primer or the adhesive. When the photo polymerization initiator is mixed in the adherent composition of the present invention, the mixture is preferably irradiated with ultraviolet light of e.g. 50–1,000 mJ/cm$^2$.

EXAMPLES

While in the following, the present invention will be described in further detail with reference to Examples, Comparative Examples and Reference Examples, the present invention is not limited to any Examples, Comparative Examples and Reference Examples.

Example 1

500 parts by weight of toluene and 200 parts by weight of EVA with a vinyl acetate content of 33% by weight, synthesized by high-pressure polymerization process, and with a melt index of 30 were added in a 2 liter reactor vessel with an agitator, a condenser, a thermometer and a nitrogen lead-in tube and were heated up to 40–50° C. of the temperature in the reactor vessel to produce homogeneous solution.

44.2 parts by weight of methanol, 6.9 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 4.8 parts by weight of ion exchange water was added to the mixture to completely terminate the saponification reaction. The saponification degree of the HEVA produced was approximately 50%.

Sequentially, while the temperature in the reactor vessel was raised to 110° C. in a stream of nitrogen gas, water and low-boiling-point compound were distilled off. After the temperature in the reactor vessel was cooled down to 100° C., 60 parts by weight of hexahydrophthalic anhydride was added to it with stirring for 60 minutes at 100–105° C. for the reaction with it to produce C-HEVA. The hydroxyl value of the C-HEVA produced was 0.02 KOHmg/g and the acid value of the same was 84 KOHmg/g.

Then, after the temperature in the reactor vessel was lowered to 60° C., 8.3 parts by weight of aqueous solution of polyoxyethylene alkylether sodium (27 weight % of aqueous solution, Emal E-27C (brand name) (Chemical Name: Polyoxyethylene alkyl (C10–16)ether sodium sulfate; Viscosity: 1500 mPa·s (at 30° C.) or below) available from Kao Corp.)(the aqueous solutions of polyoxyethylene alkylether sodium sulfate occurring in the following are all the same as this) was added to the viscous liquid. Further, 80 parts by weight of ion exchange water was added to the mixture with stirring at a speed of rotation of 2,000 min$^{-1}$ for the forced emulsification. Then, toluene was distilled off by the azeotropic boiling of water until little toluene remained in the system to produce 750 g of aqueous emulsion composition of solid content of 30 weight %.

Example 2

Except that 16.6 parts by weight of aqueous solution of polyoxyethylene alkylether sodium sulfate was added, the same operation as that of Example 1 was performed to produce 760 g of aqueous emulsion composition of solid content of 30 weight %.

Example 3

Except that 83 parts by weight of aqueous solution of polyoxyethylene alkylether sodium sulfate was added, the same operation as that of Example 1 was performed to produce 770 g of aqueous emulsion composition of solid content of 30 weight %.

Example 4

Except that 124.5 parts by weight of aqueous solution of polyoxyethylene alkylether sodium sulfate was added, the same operation as that of Example 1 was performed to produce 780 g of aqueous emulsion composition of solid content of 30 weight %.

Example 5

Except that 207.5 parts by weight of aqueous solution of polyoxyethylene alkylether sodium sulfate was added, the same operation as that of Example 1 was performed to produce 840 g of aqueous emulsion composition of solid content of 30 weight %.

Example 6

Except that instead of 83 parts by weight of aqueous solution of polyoxyethylene alkylether sodium sulfate, 20 parts by weight of polyoxyethylene nonyl phenylether (Emulgen 950 (brand name) available from Kao Corp.) was added, the same operation as that of Example 3 was performed to produce 770 g of aqueous emulsion composition of solid content of 30 weight %.

Example 7

Except that instead of 83 parts by weight of aqueous solution of polyoxyethylene alkylether sodium sulfate, 20 parts by weight of alkyl benzene sodium sulfonate (Newrex R (brand name) available from NOF Corp.) was added, the same operation as that of Example 3 was performed to produce 770 g of aqueous emulsion composition of solid content of 30 weight %.

Example 8

500 parts by weight of toluene and 200 parts by weight of EVA with a vinyl acetate content of 33% by weight, synthesized by high-pressure polymerization process, and with the melt index of 30 were added in the 2 liter reactor vessel with the agitator, condenser, thermometer and nitrogen lead-in tube and were heated up to 40–50° C. of the temperature in the reactor vessel to produce homogeneous solution.

44.2 parts by weight of methanol, 6.9 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 4.8 parts by weight of ion exchange water was added to the mixture to completely terminate the saponification reaction. The saponification degree of the HEVA produced was approximately 50%.

Sequentially, while the temperature in the reactor vessel was raised to 110° C. in a stream of nitrogen gas, water and low-boiling-point compound were distilled off. After the temperature in the reactor vessel was cooled down to 100° C., 1.7 parts by weight of acrylic acid and 0.2 parts by weight of benzoyl peroxide were added to it with stirring for 40 minutes at 110° C. for the reaction with it to produce C-HEVA. The hydroxyl value of the C-HEVA produced was 118 KOHmg/g and the acid value of the same was 3.8 KOHmg/g.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system to produce 660 g of aqueous emulsion composition of solid content of 30 weight %.

Example 9

500 parts by weight of toluene and 200 parts by weight of EVA with a vinyl acetate content of 41% by weight, synthesized by high-pressure polymerization process, and with the melt index of 65 were added in the 2 liter reactor vessel with the agitator, condenser, thermometer and nitrogen lead-in tube and were heated up to 40–50° C. of the temperature in the reactor vessel to produce homogeneous solution.

54.8 parts by weight of methanol, 8.6 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 6.0 parts by weight of ion exchange water was added to the mixture to completely terminate the saponification reaction. The saponification degree of the HEVA produced was approximately 50%.

Sequentially, while the temperature in the reactor vessel was raised to 110° C. in a stream of nitrogen gas, water and low-boiling-point compound were distilled off. After the temperature in the reactor vessel was cooled down to 100° C., 1.7 parts by weight of acrylic acid and 0.2 parts by weight of benzoyl peroxide were added to it with stirring for 40 minutes at 110° C. for the reaction with it to produce C-HEVA. The hydroxyl value of the C-HEVA produced was 150 KOHmg/g and the acid value of the same was 3.8 KOHmg/g.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system to produce 670 g of aqueous emulsion composition of solid content of 30 weight %.

Example 10

500 parts by weight of toluene and 200 parts by weight of EVA with a vinyl acetate content of 28% by weight, synthesized by high-pressure polymerization process, and with the melt index of 150 were added in the 2 liter reactor vessel with the agitator, condenser, thermometer and nitrogen lead-in tube and were heated up to 40–50° C. of the temperature in the reactor vessel to produce homogeneous solution.

21.3 parts by weight of methanol, 6.0 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 4.2 parts by weight of ion exchange water was added to the mixture to completely terminate the saponification reaction. The saponification degree of the HEVA produced was approximately 40%.

Sequentially, while the temperature in the reactor vessel was raised to 110° C. in a stream of nitrogen gas, water and low-boiling-point compound were distilled off. After the temperature in the reactor vessel was cooled down to 100° C., 1.7 parts by weight of acrylic acid and 0.2 parts by weight of benzoyl peroxide were added to it with stirring for 40 minutes at 110° C. for the reaction with it to produce C-HEVA. The hydroxyl value of the C-HEVA produced was 73 KOHmg/g and the acid value of the same was 3.8 KOHmg/g.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system to produce 660 g of aqueous emulsion composition of solid content of 30 weight %.

Example 11

600 parts by weight of toluene and 200 parts by weight of EVA with a vinyl acetate content of 41% by weight, synthesized by high-pressure polymerization process, and with the melt index of 65 were added in the 2 liter reactor vessel with the agitator, condenser, thermometer and nitrogen lead-in tube and were heated up to 40–50° C. of the temperature in the reactor vessel to produce homogeneous solution.

116.9 parts by weight of methanol, 18.3 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 3.0 parts by weight of ion exchange water was added to the mixture to completely terminate the saponification reaction. The saponification degree of the HEVA produced was approximately 80%.

Sequentially, while the temperature in the reactor vessel was raised to 110° C. in a stream of nitrogen gas, water and low-boiling-point compound were distilled off. After the temperature in the reactor vessel was cooled down to 100° C., 1.7 parts by weight of acrylic acid and 0.2 parts by weight of benzoyl peroxide were added to it with stirring for 40 minutes at 110° C. for the reaction with it to produce C-HEVA. The hydroxyl value of the C-HEVA produced was 250 KOHmg/g and the acid value of the same was 3.8 KOHmg/g.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system to produce 680 g of aqueous emulsion composition of solid content of 30 weight %.

Example 12

600 parts by weight of toluene and 200 parts by weight of EVA with a vinyl acetate content of 41% by weight, synthesized by high-pressure polymerization process, and with the melt index of 65 were added in the 2 liter reactor vessel with the agitator, condenser, thermometer and nitrogen lead-in tube and were heated up to 40–50° C. of the temperature in the reactor vessel to produce homogeneous solution.

116.9 parts by weight of methanol, 18.3 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 3.0 parts by weight of ion exchange water was added to the mixture to completely terminate the saponification reaction. The saponification degree of the HEVA produced was approximately 80%.

Sequentially, while the temperature in the reactor vessel was raised to 110° C. in a stream of nitrogen gas, water and low-boiling-point compound were distilled off. After the temperature in the reactor vessel was cooled down to 100° C., 2 parts by weight of acrylic acid, 0.2 parts by weight of benzoyl peroxide and 115 parts by weight of hexahydrophthalic anhydride were added to it with stirring for 120 minutes at 100° C. for the reaction with it to produce C-HEVA. The hydroxyl value of the C-HEVA produced was 6 KOHmg/g and the acid value of the same was 150 KOHmg/g.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system, to produce 820 g of aqueous emulsion composition of solid content of 30 weight %.

Example 13

500 parts by weight of toluene and 200 parts by weight of EVA with a vinyl acetate content of 33% by weight, synthesized by high-pressure polymerization process, and with the melt index of 30 were added in the 2 liter reactor vessel with the agitator, condenser, thermometer and nitrogen lead-in tube and were heated up to 40–50° C. of the temperature in the reactor vessel to produce homogeneous solution.

44.2 parts by weight of methanol, 6.9 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 4.8 parts by weight of ion exchange water was added to the mixture to completely terminate the saponification reaction. The saponification degree of the HEVA produced was approximately 50%.

Sequentially, while the temperature in the reactor vessel was raised to 110° C. in a stream of nitrogen gas, water and low-boiling-point compound were distilled off. After the temperature in the reactor vessel was cooled down to 100° C., 60 parts by weight of hexahydrophthalic anhydride was added to it with stirring for 60 minutes at 100–105° C. for the reaction with it to produce C-HEVA. The hydroxyl value of the C-HEVA produced was 0.01 KOHmg/g and the acid value of the same was 84 KOHmg/g.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system, to prepare an aqueous emulsion composition.

Further, 2.3 parts by weight of 2-hydroxyethyl methacrylate and 0.14 parts by weight of 2-hydroxy-2-methyl-1-phenyl-1-propanone (Darocur 1173 (brand name) available from Ciba Specialty Chemicals)(the 2-hydroxy-2-methyl-1-phenyl-1-propanone occurring in the following is the same as this) were added to the aqueous emulsion composition thus prepared, to produce 750 g of aqueous emulsion composition of solid content of 30 weight %.

Example 14

500 parts by weight of toluene and 200 parts by weight of EVA with a vinyl acetate content of 33% by weight, synthesized by high-pressure polymerization process, and with the melt index of 30 were added in the 2 liter reactor vessel with the agitator, condenser, thermometer and nitrogen lead-in tube and were heated up to 40–50° C. of the temperature in the reactor vessel to produce homogeneous solution.

44.2 parts by weight of methanol, 6.9 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 4.8 parts by weight of ion exchange water was added to the mixture to completely terminate the saponification reaction. The saponification degree of the HEVA produced was approximately 50%.

Sequentially, while the temperature in the reactor vessel was raised to 110° C. in a stream of nitrogen gas, water and low-boiling-point compound were distilled off After the temperature in the reactor vessel was cooled down to 100° C., 60 parts by weight of hexahydrophthalic anhydride was added to it with stirring for 60 minutes at 100–105° C. for the reaction with it to produce C-BEVA. The hydroxyl value of the C-HEVA produced was 0.01 KOHmg/g and the acid value of the same was 84 KOHmg/g.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system, to prepare an aqueous emulsion composition.

Further, 346.5 parts by weight of 2-hydroxyethyl methacrylate and 20.8 parts by weight of 2-hydroxy-2-methyl-1-phenyl-1-propanone were added to the aqueous emulsion composition thus prepared, to produce 924 g of aqueous emulsion composition of solid content of 25 weight %.

Example 15

500 parts by weight of toluene and 200 parts by weight of EVA with a vinyl acetate content of 33% by weight, synthesized by high-pressure polymerization process, and with the melt index of 30 were added in the 2 liter reactor vessel with the agitator, condenser, thermometer and nitrogen lead-in tube and were heated up to 40–50° C. of the temperature in the reactor vessel to produce homogeneous solution.

44.2 parts by weight of methanol, 6.9 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 4.8 parts by weight of ion exchange water was added to the mixture to completely terminate the saponification reaction. The saponification degree of the HEVA produced was approximately 50%.

Sequentially, while the temperature in the reactor vessel was raised to 110° C. in a stream of nitrogen gas, water and low-boiling-point compound were distilled off. After the temperature in the reactor vessel was cooled down to 100° C., 60 parts by weight of hexahydrophthalic anhydride was added to it with stirring for 60 minutes at 100–105° C. for the reaction with it to produce C-HEVA. The hydroxyl value of the C-HEVA produced was 0.01 KOHmg/g and the acid value of the same was 84 KOHmg/g.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system, to prepare an aqueous emulsion composition.

Further, 2.3 parts by weight of aqueous emulsion of maleic-anhydride-modified chlorinated polypropylene resin (Superchlon S-4032 (brand name) available from Nippon Paper Industries Co., Ltd.) (the aqueous emulsion of maleic-anhydride-modified chlorinated polypropylene resin occurring in the following is the same as this) was added to the aqueous emulsion composition thus prepared, to produce 770 g of aqueous emulsion composition of solid content of 30 weight %.

Example 16

500 parts by weight of toluene and 200 parts by weight of EVA with a vinyl acetate content of 33% by weight, synthesized by high-pressure polymerization process, and with the melt index of 30 were added in the 2 liter reactor vessel with the agitator, condenser, thermometer and nitrogen lead-in tube and were heated up to 40–50° C. of the temperature in the reactor vessel to produce homogeneous solution.

44.2 parts by weight of methanol, 6.9 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 4.8 parts by weight of ion exchange water was added to the mixture to completely terminate the saponification reaction. The saponification degree of the HEVA produced was approximately 50%.

Sequentially, while the temperature in the reactor vessel was raised to 110° C. in a stream of nitrogen gas, water and low-boiling-point compound were distilled off. After the temperature in the reactor vessel was cooled down to 100° C., 60 parts by weight of hexahydrophthalic anhydride was added to it with stirring for 60 minutes at 100–105° C. for the reaction with it to produce C-HEVA. The hydroxyl value of the C-HEVA produced was 0.01 KOHmg/g and the acid value of the same was 84 KOHmg/g.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system, to prepare an aqueous emulsion composition.

Further, 462 parts by weight of aqueous emulsion of maleic-anhydride-modified chlorinated polypropylene resin was added to the aqueous emulsion composition thus prepared, to produce 1,350 g of aqueous emulsion composition of solid content of 30 weight %.

Example 17

500 parts by weight of toluene and 200 parts by weight of EVA with a vinyl acetate content of 33% by weight, synthesized by high-pressure polymerization process, and with the melt index of 30 were added in the 2 liter reactor vessel with the agitator, condenser, thermometer and nitrogen lead-in tube and were heated up to 40–50° C. of the temperature in the reactor vessel to produce homogeneous solution.

44.2 parts by weight of methanol, 6.9 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 4.8 parts by weight of ion exchange water was added to the mixture to completely terminate the saponification reaction. The saponification degree of the HEVA produced was, approximately 50%.

Sequentially, while the temperature in the reactor vessel was raised to 110° C. in a stream of nitrogen gas, water and low-boiling-point compound were distilled off. After the temperature in the reactor vessel was cooled down to 100° C., 60 parts by weight of hexahydrophthalic anhydride was added to it with stirring for 60 minutes at 100–105° C. for the reaction with it to produce C-HEVA. The hydroxyl value of the C-HEVA produced was 0.01 KOHmg/g and the acid value of the same was 84 KOHmg/g.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system, to prepare an aqueous emulsion composition.

Further, 139 parts by weight of 2-hydroxyethyl methacrylate, 8.3 parts by weight of 2-hydroxy-2-methyl-1-phenyl-1-propanone and 231 parts by weight of aqueous emulsion of maleic-anhydride-modified chlorinated polypropylene resin were added to the aqueous emulsion composition thus prepared, to produce 1,080 g of aqueous emulsion composition of solid content of 30 weight %.

Example 18

500 parts by weight of toluene and 200 parts by weight of EVA with a vinyl acetate content of 33% by weight, synthesized by high-pressure polymerization process, and with the melt index of 30 were added in the 2 liter reactor vessel with the agitator, condenser, thermometer and nitrogen lead-in tube and were heated up to 40–50° C. of the temperature in the reactor vessel to produce homogeneous solution.

44.2 parts by weight of methanol, 6.9 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 4.8 parts by weight of ion exchange water was added to the mixture to completely terminate the saponification reaction. The saponification degree of the HEVA produced was approximately 50%.

Sequentially, while the temperature in the reactor vessel was raised to 110° C. in a stream of nitrogen gas, water and low-boiling-point compound were distilled off. After the temperature in the reactor vessel was cooled down to 100° C., 60 parts by weight of hexahydrophthalic anhydride was added to it with stirring for 60 minutes at 100–105 ° C. for the reaction with it to produce C-HEVA. The hydroxyl value of the C-BEVA produced was 0.01 KOHmg/g and the acid value of the same was 84 KOHmg/g.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system, to prepare an aqueous emulsion composition.

Further, 8.3 parts by weight of 2-hydroxy-2-methyl-1-phenyl-1-propanone was added to the aqueous emulsion composition thus prepared, to produce 770 g of aqueous emulsion composition of solid content of 30 weight %.

Comparative Example 1

500 parts by weight of toluene and 200 parts by weight of EVA with a vinyl acetate content of 33% by weight, synthesized by high-pressure polymerization process, and with the melt index of 30 were added in the 2 liter reactor vessel with the agitator, condenser, thermometer and nitrogen lead-in tube and were heated up to 40–50° C. of the temperature in the reactor vessel to produce homogeneous solution.

83 parts by weight of aqueous solution of polyoxyethylene alkylether sodium sulfate was added to the solution thus produced. Further, 600 parts by weight of ion exchange water was added to the mixture with stirring at a speed of rotation of 2,000 min$^{-1}$ for the forced emulsification, to thereby produce 700 g of aqueous emulsion composition of solid content of 30 weight %.

Comparative Example 2

500 parts by weight of toluene and 200 parts by weight of EVA with a vinyl acetate content of 33% by weight, synthesized by high-pressure polymerization process, and with the melt index of 30 were added in the 2 liter reactor vessel with the agitator, condenser, thermometer and nitrogen lead-in tube and were heated up to 40–50° C. of the temperature in the reactor vessel to produce homogeneous solution.

44.2 parts by weight of methanol, 6.9 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 4.8 parts by weight of ion exchange water was added to the mixture to completely terminate the saponification reaction. The saponification degree of the HEVA produced was approximately 50%.

Sequentially, while the temperature in the reactor vessel was raised to 110° C. in a stream of nitrogen gas, water and low-boiling-point compound were distilled off. The hydroxyl value of the HEVA produced was 118 KOHmg/g and the acid value of the same was zero since it was not modified with acid.

Then, after the temperature in the reactor vessel was lowered to 60° C., 83 parts by weight of aqueous solution of polyoxyethylene alkylether sodium sulfate was added to the viscous liquid. Further, 800 parts by weight of ion exchange water was added to the mixture with stirring at a speed of rotation of 2,000 min$^{-1}$ for the forced emulsification. Then, toluene was distilled off by the azeotropic boiling of water until little toluene remained in the system, to produce 640 g of aqueous emulsion composition of solid content of 30 weight %.

Reference Example 1

500 parts by weight of toluene and 200 parts by weight of EVA with a vinyl acetate content of 33% by weight, synthesized by high-pressure polymerization process, and with the melt index of 30 were added in the 2 liter reactor vessel with the agitator, condenser, thermometer and nitrogen lead-in tube and were heated up to 40–50° C. of the temperature in the reactor vessel to produce homogeneous solution.

44.2 parts by weight of methanol, 6.9 parts by weight of 24 weight % sodium methoxide-methanol solution and 0.7 parts by weight of ion exchange water, which were prepared in advance, were added to the solution thus produced and were stirred for 60 minutes at 45–55° C. for the reaction therewith. Thereafter, 4.8 parts by weight of ion exchange water was added to the mixture to completely terminate the saponification reaction. The saponification degree of the HEVA produced was approximately 50%.

Sequentially, while the temperature in the reactor vessel was raised to 110° C. in a stream of nitrogen gas, water and low-boiling-point compound were distilled off. After the temperature in the reactor vessel was cooled down to 100° C., 40 parts by weight of hexahydrophthalic anhydride was added to it with stirring for 60 minutes at 100–105° C. for the reaction with it to produce C-HEVA. The hydroxyl value of the C-HEVA produced was 0 KOHmg/g and the acid value of the same was 84 KOHmg/g.

Then, 500 parts by weight of toluene was added to the C-HEVA thus produced, to produce 1,100 g of adherent composition of organic solvent of solid content of 30 weight %.

Evaluation

Evaluation was made of dispersibility and adhesiveness of Examples, Comparative Examples and Reference Example.
1) Dispersibility
Visual evaluation was made of Examples and Comparative Examples to make demarcations according to the following ranks, the results being shown in TABLE 1.
A: Dispersed in good condition;
B: Dispersed in good condition in the initial stage, but precipitate was produced 5 days later; and C: Not dispersed uniformly 2) Adhesiveness With Examples, Comparative Examples and Reference Example as a primer for adhesive between an EVA foam and a polyvinyl chloride (PVC) sheet, evaluation was made of their adhesiveness. Specifically, the following was prepared first.

EVA foam: Sheet-like molded product of 150 mm×25 mm×25 mm;

PVC sheet: Sheet-like molded product of 150 mm×25 mm×1 mm;

Two-pack polyurethane adhesive; and

Sequentially, measurement was made of adhesiveness of the samples by the 180-degree peel test in accordance with JIS K 6854. The results are shown in TABLE 1. The evaluation of adhesiveness in TABLE 1 is as follows.

AA: Adhesive strength of 120 (N/25.4 mm) or more;

A: Adhesive strength in the range of not less than 100 to less than 120 (N/25.4 mm);

B: Adhesive strength in the range of not less than 10 to less than 100 (N/25.4 mm); and C: Adhesive strength of less than 10 (N/25.4 mm).

TABLE 1

| Composition and Evaluation | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Content of vinyl acetate in EVA (weight %) | 33 | 33 | 33 | 33 | 33 | 33 | 33 | 33 | 41 | 28 | 41 |
| Hydroxyl value (KOH mg/g) | 0.02 | 0.02 | 0.02 | 0.02 | 0.02 | 0.02 | 0.02 | 118 | 150 | 73 | 250 |
| Acid value (KOH mg/g) | 84 | 84 | 84 | 84 | 84 | 84 | 84 | 3.8 | 3.8 | 3.8 | 3.8 |
| Types of surface active agent (solid content of % by weight) | AS2 | AS2 | AS2 | AS2 | AS2 | AS3 | AS1 | AS2 | AS2 | AS2 | AS2 |
| Amount of surface active agent mixed (solid content of % by weight) | 1 | 2 | 10 | 15 | 25 | 20 | 20 | 10 | 10 | 10 | 10 |
| 2-HEMA (parts by weight per 100 parts by weight of aqueous emulsion composition) | — | — | — | — | — | — | — | — | — | — | — |
| Darocur 1173 (parts by weight per 100 parts by weight of aqueous emulsion composition) | — | — | — | — | — | — | — | — | — | — | — |
| Superchlon S-4032 (parts by weight per 100 parts by weight of aqueous emulsion composition) | — | — | — | — | — | — | — | — | — | — | — |
| Dispersibility | B | A | A | A | A | B | B | A | A | A | A |
| Adhesiveness | B | A | A | A | B | B | B | A | A | A | A |

| Composition and Evaluation | Examples | | | | | | | Compara. Ex. | | Ref. Ex. |
|---|---|---|---|---|---|---|---|---|---|---|
| | 12 | 13 | 14 | 15 | 16 | 17 | 18 | 1 | 2 | 1 |
| Content of vinyl acetate in EVA (weight %) | 41 | 33 | 33 | 33 | 33 | 33 | 33 | 33 | 33 | 33 |
| Hydroxyl value (KOH mg/g) | 6 | 0.01 | 0.01 | 0.01 | 0.01 | 0.01 | 0.01 | 0 | 118 | 0 |
| Acid value (KOH mg/g) | 150 | 84 | 84 | 84 | 84 | 84 | 84 | 0 | 0 | 84 |
| Types of surface active agent (solid content of % by weight) | AS2 | AS2 | AS2 | AS2 | AS2 | AS2 | AS2 | AS2 | AS2 | — |
| Amount of surface active agent mixed (solid content of % by weight) | 10 | 10 | 10 | 10 | 10 | 10 | 10 | 10 | 10 | — |
| 2-HEMA (parts by weight per 100 parts by weight of aqueous emulsion composition) | — | 1 | 200 | — | — | 60 | — | — | — | — |
| Darocur 1173 (parts by weight per 100 parts by weight of aqueous emulsion composition) | — | 0.1 | 12 | — | — | 3.6 | 3.6 | — | — | — |
| Superchlon S-4032 (parts by weight per 100 parts by weight of aqueous emulsion composition) | — | — | — | 1 | 200 | 100 | — | — | — | — |
| Dispersibility | A | A | A | A | A | A | A | A | A | — |
| Adhesiveness | A | AA | AA | A | A | AA | AA | C | C | A |

Primer for PVC.

Then, the primer for PVC was applied to the PVC sheet and also the adherent compositions of the Examples, Comparative Examples and Reference Example were applied to the EVA foam. As to those of Examples 13, 14, 17 and 18 in which the photo polymerization initiator was mixed, they were irradiated with ultraviolet light. Then they were adhesive bonded with each other through the two-pack polyurethane adhesive.

Surface active agent: AS1: Alkyl benzene sodium sulfonate

Surface active agent: AS2: Polyoxyethylene alkylether sodium sulfate

Surface active agent: AS3: Polyoxyethylene nonyl phenylether 2-HEMA: 2-hydroxyethyl methacrylate Darocur 1173: 2-Hydroxy-2-methyl-1-phenylpropane-1-on (available from Ciba Specialty Chemicals)

Superchlon S-4032: Maleic-anhydride-modified chlorinated polypropylene resin (available from Nippon Paper Industries Co. Ltd.)

It is seen from TABLE 1 that the samples that were bonded by using the adherent compositions of Examples 1–18 as the primer showed good adhesiveness, as compared with Comparative Examples 1 and 2, and the adhesive strength is substantially equal to or more than that of Reference Example 1.

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. An aqueous emulsion composition, comprising a carboxyl modified resin of a saponified ethylene-vinyl acetate copolymer and a surface active agent, which aqueous emulsion composition is produced by partly saponifying an ethylene-vinyl acetate copolymer, modifying the copolymer with an acid to produce the carboxyl modified resin of the saponified ethylene-vinyl acetate copolymer, and then mixing the carboxyl modified resin of the saponified ethylene-vinyl acetate copolymer with a surface active agent and water, thereby to emulsify the mixture, to obtain the aqueous emulsion composition.

2. The aqueous emulsion composition according to claim 1, wherein the carboxyl modified resin of the saponified ethylene-vinyl acetate copolymer contains the vinyl acetate in a range of 20 to 50 weight % based on the weight of raw materials used to produce the ethylene-vinyl acetate copolymer.

3. The aqueous emulsion composition according to claim 1, wherein the carboxyl modified resin of the saponified ethylene-vinyl acetate copolymer has a hydroxyl value of 0–250 KOHmg/g and an acid value of 2–150 KOHmg/g.

4. The aqueous emulsion composition according to claim 1, which further comprises an unsaturated ethylene monomer, and is produced by mixing the unsaturated ethylene monomer with the carboxyl modified resin of the saponified ethylene-vinyl acetate copolymer.

5. The aqueous emulsion composition according to claim 1, which further comprises an photo polymerization inhibitor, and is produced by mixing the photo polymerization inhibitor with the carboxyl modified resin of the saponified ethylene-vinyl acetate copolymer.

6. A The aqueous emulsion composition according to claim 1, which further comprises a chlorinated polyolefin contained resin, and is produced by mixing the chlorinated polyolefin contained resin with the carboxyl modified resin of the saponified ethylene-vinyl acetate copolymer.

7. The aqueous emulsion composition according to claim 1, wherein the surface active agent contains an oxyethylene group.

8. The aqueous emulsion composition according to claim 1, wherein the surface active agent contains an anionic group.

9. The aqueous emulsion composition according to claim 1, which contains the surface active agent in a range of 2 to 24 parts by weight per 100 parts by weight of the carboxyl modified resin of the saponified ethylene-vinyl acetate copolymer.

10. An adherent composition comprising the aqueous emulsion composition according to claim 1.

* * * * *

UNITED STATES PATENT AND TRADEMARK OFFICE
CERTIFICATE OF CORRECTION

PATENT NO.     : 6,548,605 B1                                    Page 1 of 1
DATED          : April 15, 2003
INVENTOR(S)    : Hirofumi Morita et al.

It is certified that error appears in the above-identified patent and that said Letters Patent is hereby corrected as shown below:

<u>Column 3,</u>
Line 58, please change "0.01-1" to -- 0.1-1 --.

Signed and Sealed this

Sixteenth Day of December, 2003

JAMES E. ROGAN
*Director of the United States Patent and Trademark Office*